US008359658B2

(12) United States Patent
Jacob et al.

(10) Patent No.: US 8,359,658 B2
(45) Date of Patent: Jan. 22, 2013

(54) SECURE AUTHORING AND EXECUTION OF USER-ENTERED DATABASE PROGRAMMING

(75) Inventors: Sanjay Jacob, Redmond, WA (US); Robert L. Vogt, Redmond, WA (US); Kevin Robert Schmidt, Issaquah, WA (US); Xiaohong Mark Yang, Sammamish, WA (US); Peiyuan Yan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 12/049,312

(22) Filed: Mar. 15, 2008

(65) Prior Publication Data

US 2009/0133132 A1 May 21, 2009

Related U.S. Application Data

(60) Provisional application No. 60/989,441, filed on Nov. 20, 2007.

(51) Int. Cl.
*G06F 21/00* (2006.01)

(52) U.S. Cl. .................................. 726/30

(58) Field of Classification Search ............ None
See application file for complete search history.

(56) References Cited

U.S. PATENT DOCUMENTS

| 6,226,745 | B1 | 5/2001 | Wiederhold | 713/200 |
| 6,725,287 | B1* | 4/2004 | Loeb et al. | 710/8 |
| 6,880,083 | B1 | 4/2005 | Korn | 713/170 |
| 7,136,868 | B2 | 11/2006 | Sonkin et al. | 707/102 |
| 2002/0169776 | A1 | 11/2002 | Tuunanen et al. | 707/9 |
| 2003/0110472 | A1 | 6/2003 | Alloing et al. | |
| 2003/0191730 | A1* | 10/2003 | Adkins et al. | 706/47 |
| 2003/0217352 | A1 | 11/2003 | Ueno et al. | 717/115 |
| 2004/0215599 | A1* | 10/2004 | Apps et al. | 707/2 |
| 2004/0260607 | A1* | 12/2004 | Robbins et al. | 705/14 |
| 2005/0120014 | A1 | 6/2005 | Deffler | 707/4 |
| 2005/0138160 | A1* | 6/2005 | Klein et al. | 709/223 |
| 2006/0020921 | A1 | 1/2006 | Pasumansky et al. | 717/124 |
| 2006/0020933 | A1 | 1/2006 | Pasumansky et al. | 717/140 |
| 2006/0089862 | A1* | 4/2006 | Anandarao et al. | 705/4 |
| 2006/0150150 | A1 | 7/2006 | Tiwari et al. | |
| 2006/0277593 | A1* | 12/2006 | Buchholz | 726/2 |
| 2007/0118516 | A1* | 5/2007 | Li et al. | 707/4 |
| 2007/0180439 | A1 | 8/2007 | Sundararajan et al. | |
| 2008/0109740 | A1* | 5/2008 | Prinsen et al. | 715/764 |
| 2009/0006370 | A1* | 1/2009 | Li et al. | 707/5 |
| 2009/0125482 | A1* | 5/2009 | Peregrine et al. | 707/3 |

OTHER PUBLICATIONS

"Introduction to MDX Scripting in Microsoft SQL Server 2005;" Mar. 2005, 9 pgs.; http:technet.microsoft.com/hi-in/library/ms345116.aspx#imdxsmss05_topic3.
"MDX Script Performance Analyser;" Apr. 2007; 3 pgs.; http://codeplex.com/mdxscriptperf/Project/ProjectRss.aspx.
International Search Report issued Jun. 29, 2009 in PCT/US2008/082367 filed Nov. 4, 2008.

* cited by examiner

*Primary Examiner* — David Pearson
(74) *Attorney, Agent, or Firm* — Merchant & Gould

(57) ABSTRACT

A secure framework for authoring and execution of user-entered database scripts, rules, procedures and other forms of programming is provided. A performance management application is used as an interface between a client data modeling, manipulation or analysis application and one or more data sources or analysis services to prevent malicious or inadvertent implementation of harmful, damaging and/or unauthorized new or modified scripts, rules, procedures or other forms of programming to one or more data sources or data analysis/manipulation services that may be used for retrieving, storing, modifying or using data contained in or affected by the one or more data sources or data analysis/manipulation services.

20 Claims, 3 Drawing Sheets

SECURE AUTHORING AND EXECUTION OF USER-ENTERED DATABASE PROGRAMMING

RELATED APPLICATIONS

This application claims the benefit of U.S. Provisional Application No. 60/989,441, filed Nov. 20, 2007, entitled "Secure Authoring and Execution of User-Friendly Script and Rules," which is hereby incorporated by reference in its entirety.

BACKGROUND

Software applications have been developed to allow users to store, manipulate and analyze large amounts of a variety of data, for example, business data, educational data, medical and legal data, personal data, and the like. For example, a business may store and analyze manufacturing and sales data across multiple operating units. Often users employ the languages of such software applications to modify existing or introduce new rules, procedures, scripts or other forms of programming for data storage, retrieval, calculation, manipulation and analysis. Such changes are often desired when stored programming (e.g., stored procedures, rules, scripts) or "out of the box" procedures supplied with a given software application do not provide desired data analysis or manipulation. Unfortunately, implementation of such programming changes may present serious security risks because they could potentially allow a user with access to only one data site to make drastic changes across a number of data sites.

It is with respect to these and other considerations that the present invention has been made.

SUMMARY OF THE INVENTION

Figure 1:
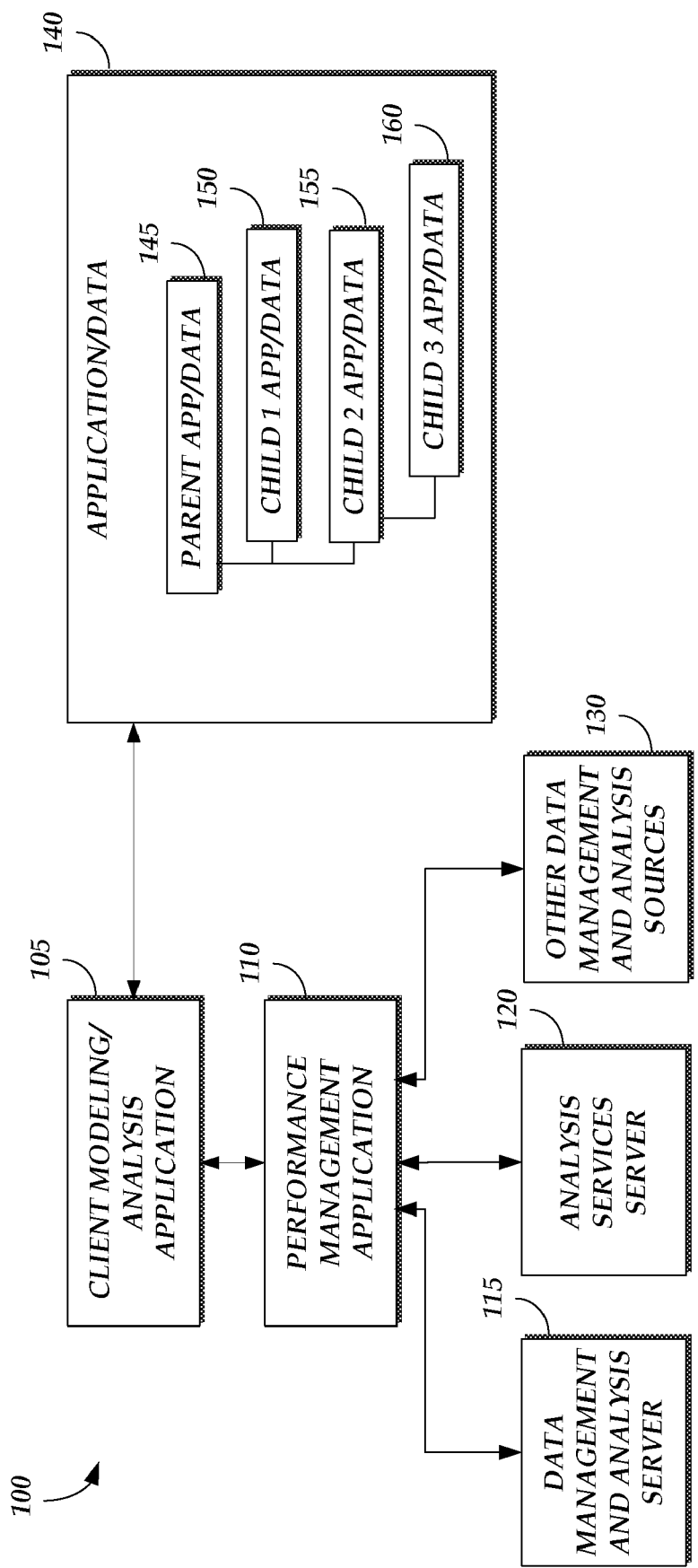
FIG. 1 is a block diagram illustrating a system for secure authoring and execution of user-entered script, rules and procedures.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing a secure framework for authoring and execution of user-entered database scripts, procedures and other forms of programming. According to an embodiment, a performance management application is used as an interface between a client data modeling, manipulation or analysis application and one or more data sources or analysis services to prevent malicious or inadvertent implementation of harmful, damaging and/or unauthorized new or modified scripts, procedures or other forms of programming to one or more data sources or data analysis/manipulation services that may be used for retrieving, storing, modifying or using data contained in or affected by the one or more data sources or data analysis/manipulation services.

These and other features and advantages will be apparent from a reading of the following detailed description and a review of the associated drawings. It is to be understood that both the foregoing general description and the following detailed description are explanatory only and are not restrictive of the invention as claimed.

DESCRIPTION OF THE INVENTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to securing authoring and execution of user-entered script, rules, procedures or any other form of potentially malicious or harmful data or software programming. In general, embodiments provide a secure framework for authoring and execution of user-entered database scripts, procedures and other forms of programming. A performance management application is used as an interface between a client data modeling, manipulation or analysis application and one or more data sources or analysis services to prevent malicious or inadvertent implementation of harmful, damaging and/or unauthorized implementation of new or modified scripts, procedures or other forms of programming to one or more data sources or data analysis/manipulation services that may be used for changing data items. The performance management application, may be utilized for securing access to one or more data sources and/or data analysis services, and the performance management application may be used for providing limited access to one or more data sources and/or data analysis services by providing an approval on a case-by-case basis for any new or modified script, procedure or programming that is applied to a given data source or data analysis service.

For purposes of simplification, the term "rule" is used hereinafter to mean any script, procedure or other form of programming that may be applied to a data source or data analysis service for affecting input, retrieval, analysis, or modification of data. In addition the term "regular" is used hereinafter to mean a rule that is available to users as part of the normal operation of a given data modeling, analysis or manipulation application that are available to all users of such application. Furthermore the scripts, procedures or other form of programming in a "regular" rule are generated by the system rather than input by the end user directly. The term "native" is used to mean a rule that is not part of such normal operation. In addition, a "native rule" contains scripts, procedures or other form of programming that are not generated by the system but directly input by the end user. In effect, the performance management application may be used to allow a user or data modeler via a client application to build or supply one or more new or modified rules for application to a specified data item or data analysis service, followed by an approval to actually apply the new or modified rules to the specified data item or data analysis service. According to one embodiment, the case-by-case approval may be applied only to native rules, or in contrast, for data that is highly sensitive or where a data administrator desires complete control of data access, this case-by-case approval may be applied to regular and native rules, scripts, procedures or other forms of programming.

FIG. 1 is a block diagram illustrating a system 100 for secure authoring and execution of user-entered rules. The system 100, illustrated in FIG. 1, includes a client modeling/analysis application 105. The client modeling/analysis application is illustrative of a software application operative to access, input, retrieve, manipulate, analyze, display, print or otherwise utilize data. According to one embodiment the client modeling/analysis application may include a data modeling application for modeling one or more data items for planning, managing, inputting, retrieving or otherwise utilizing data. One example of a suitable client modeling/analysis application is the PLANNING BUSINESS MODELER manufactured by MICROSOFT CORPORATION of Redmond, Wash. The Planning Business Modeler may serve as a primary interface for creating and managing business data models. The models that are created by using Planning Business Modeler application may integrate relevant information about a company or other entity. The integrated information may be used to measure performance, plan, budget, and forecast. By using these data models, powerful data applications may be built that allow for complex planning, budgeting, forecasting, and data consolidation.

Referring still to FIG. 1, application/data 140 is illustrative of data or a data application against which the client modeling/analysis application 105 is utilized for providing useful data analysis or modeling. For example, the application/data 140 may include an application that has a shared library of predefined dimensions, model types, and associated data rules, a parent model site, and model subsites. The application/data 140 may contain all components of a given data model for performing complex planning, budgeting, forecasting, and other performance management functions by defining models, dimensions, data input assignment cycles, and associated business or data processes. The application/data 140 may serve as a primary container for all information that a user or data modeler must have in order to store and describe his/her data, the processes that control access to data and data definitions, and the security settings that define who can access data and data definitions.

The application/data 140 also may contain a hierarchy of model sites that are used to organize the application/data. Referring still to FIG. 1, each application/data 140 may have one parent model site 145 that contains predefined dimensions and global assumption models. All other model sites in the application/data 140 may be referred to as model subsites or child subsites 150, 155, 160. For example, a parent model site 145 may represent a company and the model subsites or child subsites may represent the company's business structure. For example, the subsites may be based on a company's reporting structure, financial processes, operational processes, and so on. For example, a company may create subsites that are based on divisions, on business units, or on security access restrictions that require separation of processes or functions.

Referring still to FIG. 1, a performance management application 110 is illustrative of a data management software application operative to serve as an interface between the client data modeling/analysis application 105 and one or more data sources or data analysis services to prevent malicious or inadvertent implementation of harmful, damaging and/or unauthorized implementation of new or modified rules against the one or more data sources or data analysis services. The performance management application, may be utilized for securing access to one or more data sources and/or data analysis services, and the performance management application may be used for providing limited access to one or more data sources and/or data analysis services by providing an approval on a case-by-case basis (e.g., rule-by-rule basis) for any new or modified rule that is applied to a given data source or data analysis service.

According to an embodiment, the performance management application 110 may include a PERFORMANCEPOINT SERVER manufactured by MICROSOFT CORPORATION of Redmond, Wash. The PerformancePoint Server is a planning and monitoring application that allows organizations to model and manage the business and organizational drivers that impact business and processes. For example, the PerformancePoint Server may be utilized for planning for future operational capacity and/or planning for headcount resources and staffing. As should be appreciated, many rules (scripts, rules, procedures or other forms of programming) needed by a data user or data modeler may be regular rules available from the client modeling/analysis application 105 or via the performance management application 110. On the other hand, often a data user or data modeler may desire to build and apply a new or modified "native" rule for generating a complex data model or a data model otherwise not anticipated by developers of the client modeling/analysis or performance management applications 105, 110. As described herein, the performance management application 110 may be used as an interface or gatekeeper for providing rule-by-rule approval for application of native or otherwise unauthorized rules for application to one or more data sources or data analysis services.

Referring still to FIG. 1, the data management and analysis server 115 is illustrative of a software application operative to provide for the storage, retrieval, analysis, manipulation, and assembly of one or more data items. According to an embodiment, the data management and analysis server 115 is operative to receive data modeling and/or analysis rules from the client modeling/analysis application 105 upon approval on a rule-by-rule basis by the performance management application 110 where the received rules are generated according to a language applicable to the data management and analysis server 115. For example, according to one embodiment, the data management and analysis server may be in the form of a SQL SERVER manufactured by MICROSOFT CORPORATION of Redmond, Wash. The Microsoft SQL Server is a comprehensive, integrated data management and analysis software application that enables individual users and organizations to manage information and run complex applications against stored data.

Referring still to FIG. 1, the analysis services server 120 and the other data management and analysis sources 130 are illustrative of any number of data and analysis sources, repositories and software programs that a user may access from the client modeling/analysis application 105 for obtaining data, processing data, running data rules via the security mechanisms of the performance management application 110, described herein. For example, the analysis services server 120 may be in the form of a SQL Server Analysis Services server that utilizes multidimensional expressions (MDX) query language for utilizing multidimensional data as required or desired by a data user or data modeler via the client modeling/analysis application 105, described herein. The other data management and analysis sources 130 may include any number of data storage or management sources against which a rule(s) may be applied by a data user or data modeler via the client modeling/analysis application 105 under the security approval of the performance management application 110.

As should be appreciated, the components of the system 100 described above are for purposes of example only and are not limiting of the vast numbers of data sources and analytical applications that may be accessed and operated by a client application 105 via the security mechanisms of the performance management application 110, described herein. In addition, the components of the system 100 may be operated on a single computing device 300, described below, or each of the components or combinations of the components may be operatively associated or linked to other components or combinations of components of the system 100 via a distributed computing network, such as an intranet or the Internet.

Figure 2:
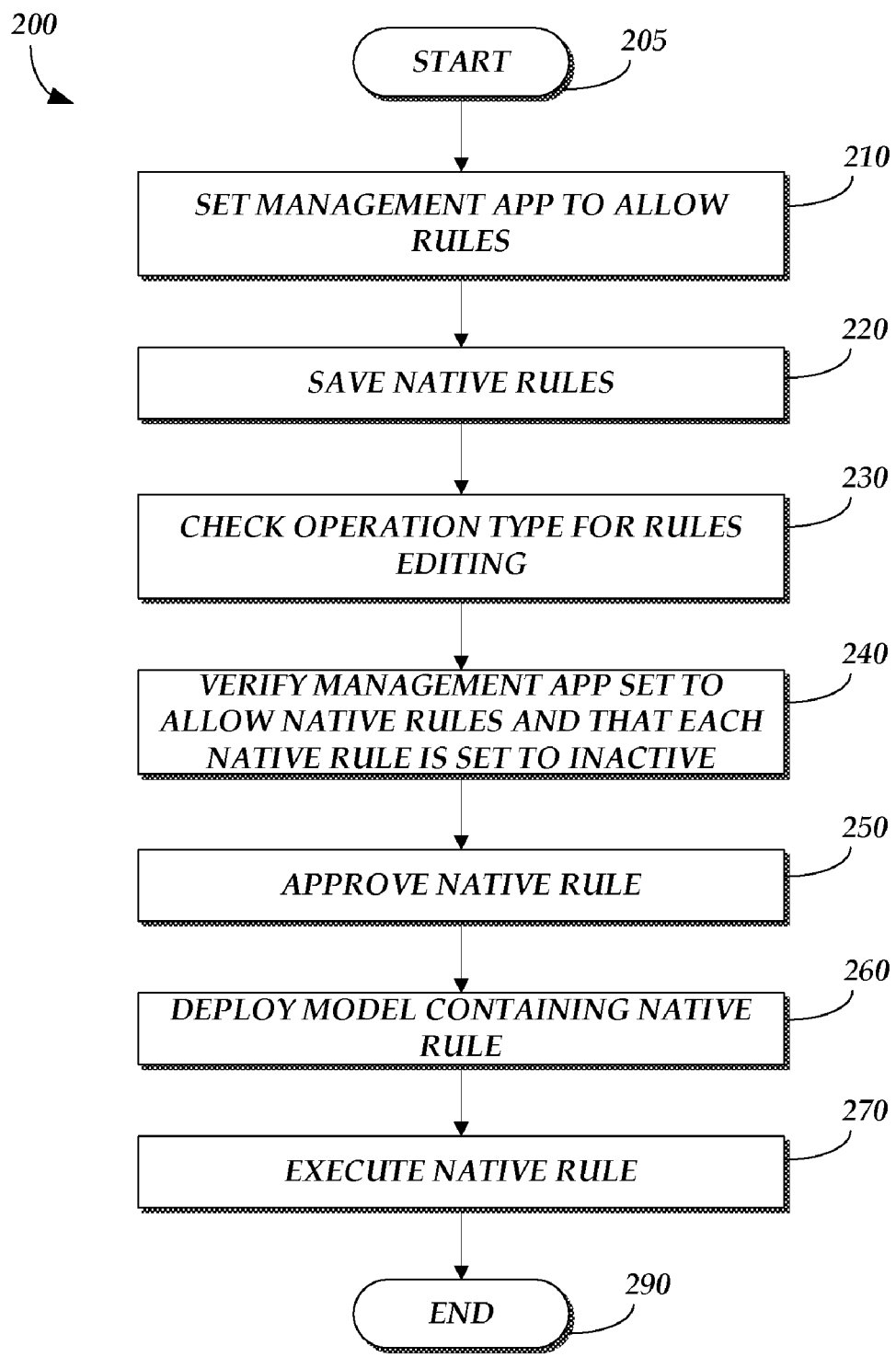
FIG. 2 is a logical flow diagram illustrating a method for secure authoring and execution of user-entered script, rules and procedures.

Having described an operating environment for embodiments of the present invention with respect to FIG. 1, FIG. 2 is a logical flow diagram illustrating a method for secure authoring and execution of user-entered rules against one or more data sources or data analysis services. The logical flow illustrated in FIG. 1 is described in terms of the components of the system 100 illustrated in FIG. 1, but it should be appreciated that the logical flow illustrated in FIG. 2 is equally applicable to a variety of other environments in which a performance management application 110 is operative to secure the application of a software rule, procedure, script or other form of programming against one or more data items on a case-by-case basis. For purposes of description of the logical flow illustrated in FIG. 2, consider that a data user or data modeler desires to apply a native rule against a data item via one of the data management sources 115, 120, 130. According to an embodiment, the data user or data modeler may apply the native rule only upon approval via the performance management application 110.

The routine 200 begins at start operation 205. At operation 210, the performance management application 110 is set to allow creation and storage of native rules to be applied against specified data sources 115, 120, 130. According to a particular embodiment, a data administrator for data to which the native rules are to be applied sets an "Allow Native SQL\MDX Rules" flag to true or enabled. This flag is stored as a Boolean on the application 140 object and only users with the EditMetadata at the application level have access to modify the flag. This step may not be required for regular rules, but may be required for regular rules where the data is particularly sensitive or otherwise requires security against application of any rule, including regular rules. For example, at operation 210, an administrator enables, via one or more application programming interfaces (API) described below, the application of one or more rules against data applicable to a specified application/data 140 on a rule-by-rule basis. According to one embodiment, the performance management application by default is set to disabled so that the administrator must affirmatively set the flag to "true" or enabled to allow rules to be written and applied as desired. That is, operation of the performance management application for securing application of rules against data is an "opt in" process wherein only those rules approved via the performance management application may be utilized.

At operation 220, if the performance management application has been set to allow a new or modified rule, as described above, then the data user or data modeler may then write and save the new native rule. That is, without having the "Allow Native SQL/MDX Rules" flag set to true (enabled), for example, the data modeler may not actually write and save the new or modified native rule. When the modeler does write and save the rule, the rule must be saved in an inactive state which means an InActive flag is set to true according to one embodiment.

At operation 230, whenever any rule edits are saved (even edits to regular rules) the performance management application 110 checks for an EditRules operation type in the context of the model in which the rules are being saved. At operation 240, in the case of native rules, the application 110 additionally checks that the "Allow Native SQL\MDX Rules" flag is enabled (set to true) and that each native rule is inactive. Any rule set to InActive cannot be deployed against the data source and cannot be executed. At this operation, the data modeler is generating and saving the desired native rule, but is still prohibited from applying the native rule until it is approved via the performance management application 110. In addition, even after a given native rule has been approved for application, if the rule is subsequently modified, it will be set to inactive and will once again require approval for application by the modeler.

At operation 250, the native rule may be approved for implementation as desired by the data user or data modeler. According to one embodiment, the database administrator must approve the rule by setting the "IsActive" flag to true for the rule in the database. This flag is stored in the RuleSetsOrRules table in the IsActivated column. Access to this table is controlled according to standard SQL permissions. This step may not be required for regular rules unless those rules otherwise are designated for requiring security, as described above. At this operation, the modeler has written his/her native rule and he/she wants to get the rule approved for actual use (execution) against the desired data. The database administrator must review and approve by setting the InActive flag to true.

At operation 260, the native rule(s) that has been approved via the performance management application 110 may be deployed to the target data source, such as the data management and analysis server 115, the analysis services server 120 and/or the other data management and analysis sources 130. That is, now that the rule has been approved it may be compiled as code and may be inserted into the target database. According to an embodiment, the model containing the rule must be deployed by a modeler. This step is required even for regular rules. As part of deployment the performance management application 110 will always check for the GenerateApplication operation type in the scope of the model being deployed. Additionally for native rules, the application 110 will check if the application "Allow Native SQL\MDX Rules" flag is enabled. Both regular and native rules are never deployed if they are set to InActive.

At this step, the client modeling/analysis application 105 sends a request to the performance management application 110 to request that the approved native rule be deployed as requested. The performance management application 110 will serve as an interface between the client modeling/analysis application 105 and the target data source or analysis service. That is, the performance management application will compile the approved native rule and insert it into the target database (data source) 115, 120, 130, and may return an acknowledgement (for example "success" indication) to the client modeling/analysis application.

According to an embodiment, before the performance management application actually deploys the compiled rule for execution, it double checks each individual rule to make sure none of the rules have been disabled since they were originally approved. For example, a rule may be enabled now for deployment 24 hours from now, but between now and the deployment and execution time, the rule may have been disabled by another administrator for some reason.

At operation 270, the native rule may be executed as approved. That is, a data modeler is now able to execute the native rule using any of the standard execution paths. If the modeler executes it directly via the client modeling/analysis application 110, the ExecuteRule operation type will be checked in the context of the model. If he/she creates a job and schedules it or assigns it to a user then the ManageWorkflow operation type will be checked with the scope of the model site in which the model is in. If he/she sets to rule to be executed by the system (this has to have been done when he/she created the rule) then no further operation types are checked. In addition to the standard checks above which are applied to all rules, there is an additional check for the "Allow Native SQL\MDX Rules" flag whenever a native rule is executed from any code path. If the flag is false then the execution will fail. The method, illustrated in FIG. 2, ends at operation 290.

According to an embodiment, the system and process, described herein, allows a data administrator to create an approval process around each native rule. In some cases the administrator may decide that native rules are unnecessary for his\her application and will choose never to activate the "Allow Native SQL\MDX Rules" flag. By default this flag is set to false. Even once that flag has been activated, every rule must be authored by a modeler and approved by an authorized administrator. This gives the administrator a chance to create a review system to use before the rule is put in place. Finally if the administrator ever decides that they no longer want native rules in the system then they are able to disable the "Allow Native SQL\MDX Rules" flag. Once this happens native rules cannot be created, updated, deployed, or executed. They can only be deleted.

Example Operating Environment

Figure 3:
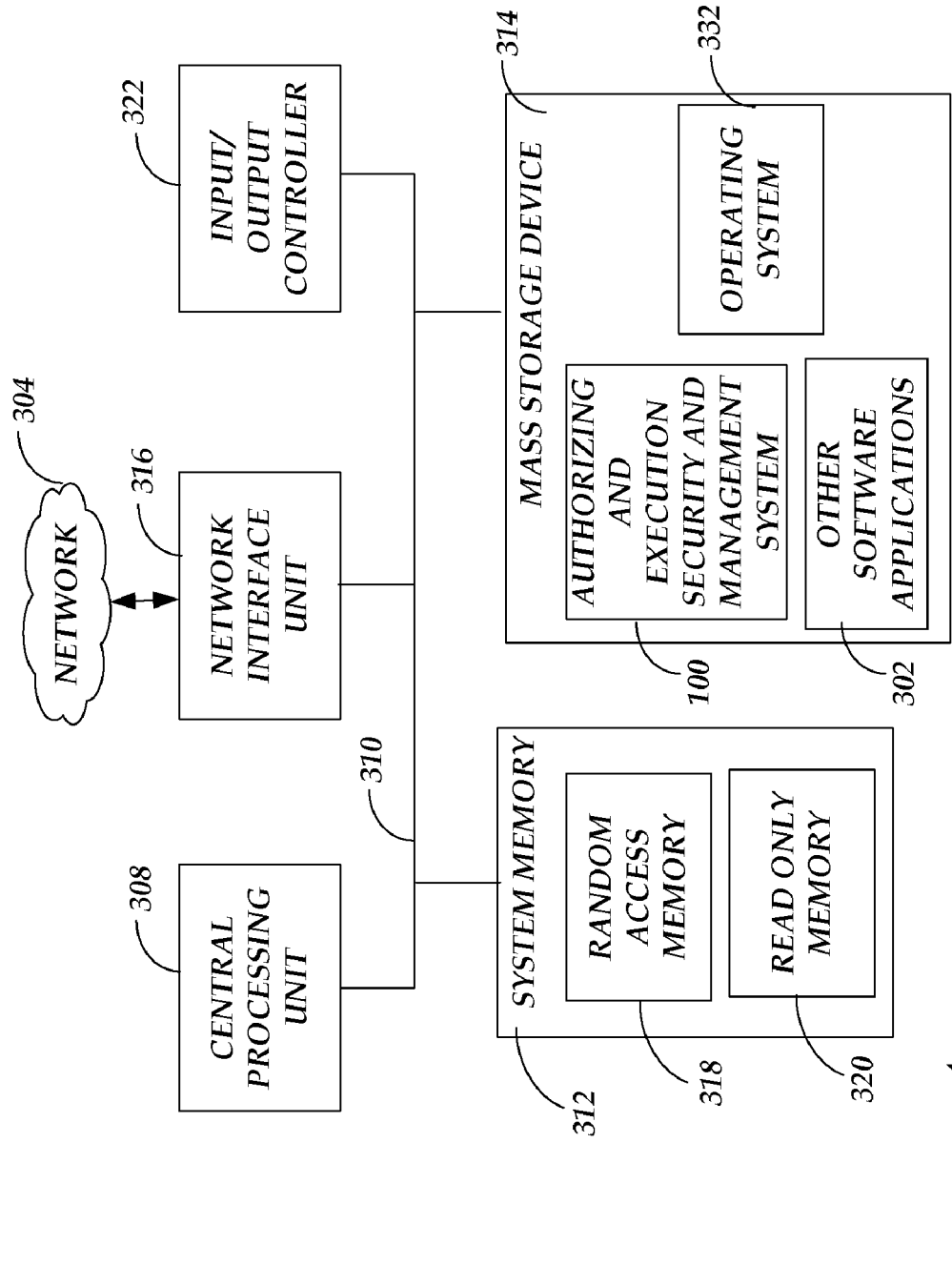
FIG. 3 is a block diagram illustrating an example computing operating environment, for example, a desktop computer, a laptop computer, a mobile computer, a server computer, and the like, in which embodiments of the invention may be practiced.

FIG. 3 is a block diagram illustrating an example computing operating environment, for example, a desktop computer, a laptop computer, a mobile computer, a server computer, and the like, in which embodiments of the invention may be practiced. That is the computing environment illustrated in FIG. 3 is operative to contain and operate each of the components of the system 100, illustrated in FIG. 1. Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 300 comprises a general purpose desktop, laptop, handheld, mobile or other type of computer (computing device) capable of executing one or more application programs. The computer 300 includes at least one central processing unit 308 ("CPU"), a system memory 312, including a random access memory 318 ("RAM") and a read-only memory ("ROM") 320, and a system bus 310 that couples the memory to the CPU 308. A basic input/output system containing the basic routines that help to transfer information between elements within the computer, such as during startup, is stored in the ROM 320. The computer 302 further includes a mass storage device 314 for storing an operating system 332, application programs, and other program modules.

The mass storage device 314 is connected to the CPU 308 through a mass storage controller (not shown) connected to the bus 310. The mass storage device 314 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available media that can be accessed or utilized by the computer 300.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 300.

According to one embodiment, the authoring and execution security and management system 100 is operative to secure authoring and execution of user-entered script, rules and procedures as described herein. The applications 302, illustrated in FIG. 3, may comprise many types of software applications, such as an electronic mail program, a calendaring program, an Internet browsing program, and the like. An example of such programs is OUTLOOK® manufactured by MICROSOFT CORPORATION. The application 302 may include a number of other types of software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. In addition, the applications 302 may include one or more applications and associated data 105, 110, 115, 120, 130 and 140, described above.

According to various embodiments of the invention, the computer 300 may operate in a networked environment using logical connections to remote computers through a network 304, such as a local network, the Internet, etc. for example. The computer 302 may connect to the network 304 through a network interface unit 316 connected to the bus 310. It should be appreciated that the network interface unit 316 may also be utilized to connect to other types of networks and remote computing systems. The computer 300 may also include an input/output controller 322 for receiving and processing input from a number of other devices, including a keyboard, mouse, etc. (not shown). Similarly, an input/output controller 322 may provide output to a display screen, a printer, or other type of output device.

As mentioned briefly above, a number of program modules and data files may be stored in the mass storage device 314 and RAM 318 of the computer 300, including an operating system 332 suitable for controlling the operation of a networked personal computer, such as the WINDOWS® operating systems from MICROSOFT CORPORATION of Redmond, Wash. The mass storage device 314 and RAM 318 may also store one or more program modules. In particular, the mass storage device 314 and the RAM 318 may store application programs, such as a software application 324, for example, a word processing application, a spreadsheet application, a slide presentation application, a database application, etc.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

We claim:

1. A method for secure authoring and execution of user-entered database programming, comprising:
   allowing creation and storage of programming, including native programming, to be applied to one or more data items including enabling creation of the native programming for a data management application in part using a native rule flag;
   receiving the programming via a data modeling/analysis application to be applied to the one or more data items including using an isactive flag to activate a native rule associated with the native programming;
   using an inactive flag as part of ensuring the programming to be applied to the one or more data items is set to an inactive state so that the programming may not be applied to the one or more data items without permission including setting the native rule flag to the inactive state for the native rule after any modification and requiring approval of each modified native rule before application and using the native rule flag to control application of the native programming in the data management application including checking the native rule flag when each native rule is executed from any code path;
   approving application of the programming to the one or more data items; and
   applying the programming to the one or more data items after the approving.

2. The method of claim 1, wherein allowing creation and storage of a programming to be applied to one or more data items includes using the data management application as a gatekeeper to prohibit applying the native programming until after approval using the isactive flag.

3. The method of claim 2, wherein programming the data management application to allow creation and storage of the programming to be applied to the one or more data items includes setting an "Allow Native SQL\MDX Rules" flag at the data management application.

4. The method of claim 1, wherein receiving the programming to be applied to the one or more data items includes receiving the programming via the data modeling/analysis application operative to construct a data modeling/analysis programming for application to the one or more data items, the data modeling/analysis programming including the programming to be applied to the one or more data items.

5. The method of claim 1, wherein approving application of the programming to the one or more data items includes approving application of the programming to the one or more data items via the data management application.

6. The method of claim 5, wherein ensuring the programming to be applied to the one or more data items is set to an inactive state so that the programming may not be applied to the one or more data items without permission includes ensuring the created and stored programming is set an inactive state until a permission is received to set the programming to an active state.

7. The method of claim 6, wherein approving application of the programming to the one or more data items includes setting the programming to an active state to allow application of the programming to the one or more data items.

8. The method of claim 7, wherein setting the programming to an active state to allow application of the programming to the one or more data items includes setting the programming to an active state to allow application of the programming to the one or more data items via the data management application.

9. The method of claim 1, wherein applying the programming to the one or more data items includes applying a data model to the one or more data items, the data model including the programming to be applied to the one or more data items.

10. The method of claim 9, prior to applying the data model to the one or more data items, ensuring the programming to be applied to the one or more data items is allowed to be applied to the one or more data items.

11. The method of claim 10, wherein ensuring the programming is allowed to be applied to the one or more data items includes ensuring that an "Allow Native SQL\MDX Rules" flag is enabled for the programming to be applied to the one or more data items.

12. The method of claim 11, wherein ensuring the programming is allowed to be applied to the one or more data items includes ensuring the programming is allowed to be applied to the one or more data items via the data management application.

13. The method of claim 1, wherein if any modifications to the programming are received prior to application of the programming to the one or more data items, disenabling application of the modified programming to the one or more data items until permission for application of the modified programming is received.

14. The method of claim 1, wherein allowing creation and storage of programming to be applied to one or more data items, includes allowing creation of any script, rule, procedure and/or other form of programming operative against a database data item or database operation.

15. A system for secure authoring and execution of user-entered database programming, comprising:
   at least one processor and memory;
   a data modeling/analysis application to construct a programming that includes native programming; and
   a database management application operative:

to allow creation and storage of the programming to be applied to one or more data items and enable creation of the native programming in part using a native rule flag including checking the native rule flag when each native rule is executed from any code path;

to receive the programming to be applied to the one or more data items;

to use an inactive flag in part to ensure that the native programming to be applied to the one or more data items is set to an inactive state so that the native programming may not be applied to the one or more data items without permission including setting the native rule flag to an inactive state for a modified native rule and requiring approval of each modified native rule before application;

to approve application of the programming to the one or more data items; and to apply the programming to the one or more data items.

16. The system of claim 15, further comprising:

the data modeling/analysis application operative to construct a data modeling/analysis programming for application to one or more data items including the programming to be applied to the one or more data items; and a database application operative to maintain the one or more data items; and to receive and apply the programming to the one or more data items.

17. The system of claim 16, wherein the data management application is further operative to pass the programming to be applied to the one or more data items to the database application.

18. The system of claim 17, wherein the database management application is further operative to set an "Allow Native SQL\MDX Rules" flag to enabled to allow creation and storage of the programming to be applied to the one or more data items; and to set the programming to be applied to the one or more data items to an active state to allow application of the programming to the one or more data items.

19. A computer storage device containing computer readable instructions which when executed by a computer perform a method for secure authoring and execution of user-entered database programming, comprising:

allowing creation and storage of a database rule via a data modeling/analysis application to be executed against one or more data items maintained by a database management application, including creating native programming in part using a native rule flag including checking the native rule flag when each native rule is executed from any code path;

receiving a request at a database management application for execution of the database rule against the one or more data items;

using an inactive flag at the database management application as part of ensuring the database rule to be executed against the one or more data items is set to an inactive state so that the database rule may not be executed against the one or more data items without permission including setting the native rule flag to the inactive state for the native rule after any modification and requiring approval of each modified native rule before application;

using an is active flag at the database management application as part of approving execution of the database rule against the one or more data items;

passing the database rule to the database application for execution against the one or more data items; and executing the database rule against the one or more data items.

20. The computer storage device of claim 19, wherein approving execution of the database rule against the one or more data items includes: at the database management application, setting the database rule to an active state to allow execution of the database rule against the one or more data items.

* * * * *